(12) United States Patent
Feldmann et al.

(10) Patent No.: US 8,463,463 B1
(45) Date of Patent: Jun. 11, 2013

(54) METHODS FOR FORMATION FLYING AIDED BY A RELATIVE NAVIGATION SYSTEM

(75) Inventors: Michael Steven Feldmann, Rockford, MI (US); Jerry Lynne Page, Alto, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 13/405,718

(22) Filed: Feb. 27, 2012

(51) Int. Cl.
*G06F 17/00* (2006.01)
(52) U.S. Cl.
USPC ............... 701/3; 701/1; 701/4; 701/5; 701/8; 701/9; 701/13; 701/14; 701/15; 701/16; 701/23; 701/120; 701/300; 701/301; 701/467; 701/503; 340/945; 340/946; 340/963; 340/970; 340/973; 340/974; 340/979; 340/980; 340/990; 342/29; 342/63; 342/56; 342/176; 342/179; 362/34; 362/470; 345/672; 33/431
(58) Field of Classification Search
USPC ................. 701/1, 3, 4, 5, 8, 9, 13, 14, 15, 16, 701/23, 120, 300, 301, 467, 503, 504; 340/945; 340/946, 963, 970, 973, 974, 979, 980, 990; 342/29, 63, 65, 176, 179; 362/34, 470; 345/672; 33/431
See application file for complete search history.

(56) References Cited

U.S. PATENT DOCUMENTS

| | | | |
|---|---|---|---|
| 4,232,313 A * | 11/1980 | Fleishman | 342/36 |
| 5,465,142 A | 11/1995 | Krumes et al. | |
| 5,838,262 A | 11/1998 | Kershner et al. | |
| 6,641,082 B2 * | 11/2003 | Bevilaqua et al. | 244/2 |
| 6,669,145 B1 | 12/2003 | Green | |
| 6,789,768 B1 | 9/2004 | Kalisch | |
| 6,926,233 B1 * | 8/2005 | Corcoran, III | 244/76 R |
| 7,010,398 B2 | 3/2006 | Wilkins, Jr. et al. | |
| 7,357,352 B2 * | 4/2008 | Speer et al. | 244/2 |
| 7,681,839 B2 | 3/2010 | Mickley et al. | |
| 7,701,592 B2 | 4/2010 | Saint Clair et al. | |
| 7,768,631 B1 | 8/2010 | Rovinsky | |
| 7,966,872 B2 * | 6/2011 | Lutke et al. | 73/118.03 |
| 7,975,958 B2 * | 7/2011 | Sommer | 244/3 |
| 8,061,646 B2 * | 11/2011 | Gomez et al. | 244/2 |
| 8,172,172 B2 * | 5/2012 | Gomez et al. | 244/2 |
| 8,226,025 B2 * | 7/2012 | Gomez et al. | 244/2 |
| 2005/0165516 A1 | 7/2005 | Haissig et al. | |
| 2006/0226293 A1 | 10/2006 | Mickley et al. | |
| 2010/0332136 A1 | 12/2010 | Duggan et al. | |
| 2011/0130913 A1 | 6/2011 | Duggan et al. | |
| 2011/0134249 A1 | 6/2011 | Wood et al. | |
| 2011/0153205 A1 | 6/2011 | Stimac et al. | |

FOREIGN PATENT DOCUMENTS

| | | |
|---|---|---|
| EP | 1094001 A2 | 4/2001 |
| GB | 1553388 A | 9/1979 |
| JP | 2006168461 A | 6/2006 |

* cited by examiner

*Primary Examiner* — McDieunel Marc
(74) *Attorney, Agent, or Firm* — McGarry Bair PC

(57) ABSTRACT

Methods for flying multiple aircraft in a predetermined formation in which a relative navigation grid is emitted from at least one of the aircraft, a spatial relationship is calculated based on the emitted relative navigation grid, and a relative position of at least one aircraft is altered to position the aircraft in the predetermined formation when the spatial relationship does not conform with the predetermined formation.

25 Claims, 5 Drawing Sheets

METHODS FOR FORMATION FLYING AIDED BY A RELATIVE NAVIGATION SYSTEM

BACKGROUND OF THE INVENTION

Formation flying, sometimes referred to as station keeping, wherein multiple aircraft are flown in close proximity, may be desired for a multitude of reasons including force multiplication, collaboration or fusion of disparate sensor data, radar signature minimization, reduction in the amount of time required to traverse an area with a fleet of aircraft, etc. Such flight in close proximity to other aircraft increases the risk of aircraft interfering with the flight of another or, in worst case, a midair collision. Establishing and maintaining the desired separation between such aircraft may be done visually in good weather by highly skilled pilots. In poor weather, or in the case of unmanned aircraft, ensuring desired separation requires an alternate means for determining relative position and velocity between participating aircraft. In the past, this has been done using complex systems of equipment and specially trained pilots. These systems tend to be very expensive to develop and maintain, requiring significant amounts of training to use, which causes high workloads for pilots. The systems also emit large amounts of radio frequency energy making them easy to detect and attack, and rely on subsystems such as Global Positioning Systems (GPS) which are easily jammed or otherwise denied. Additionally, the precision of navigation information available from these systems is significantly less than desired for unmanned aerial vehicle swarming operations where the desired separation between aircraft must be minimized.

BRIEF DESCRIPTION OF THE INVENTION

In one embodiment, a method of flying aircraft in a predetermined formation includes emitting from one of the aircraft a relative navigation grid to define an emitting aircraft amongst the aircraft, calculating a spatial relationship between two of the aircraft based on the emitted relative navigation grid, determining if the spatial relationship conforms with the predetermined formation, and altering a relative position of at least one of the aircraft to position the aircraft in the predetermined formation when the spatial relationship does not conform with the predetermined formation.

In another embodiment, a method of flying multiple aircraft in a predetermined formation includes emitting from at least one of the multiple aircraft a relative navigation grid to define at least one emitting aircraft amongst the multiple aircraft, calculating a spatial relationship between the multiple aircraft based on the at least one emitted relative navigation grid, determining if the spatial relationship conforms with the predetermined formation, transmitting the spatial relationship to at least another one of the multiple aircraft, and altering a relative position of at least the another one of the multiple aircraft to position the aircraft in the predetermined formation when the spatial relationship does not conform with the predetermined formation.

DESCRIPTION OF EMBODIMENTS OF THE INVENTION

Figure 1:
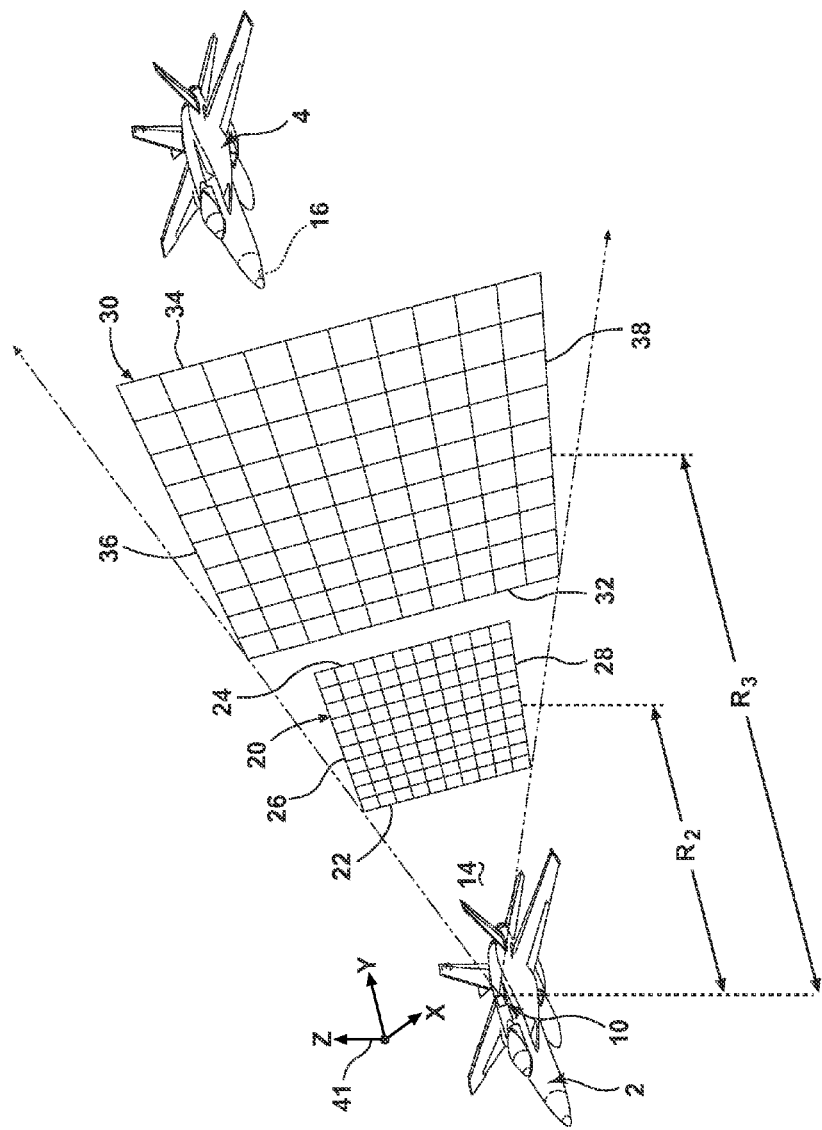
FIG. 1 is a perspective view of aircraft and a grid generator according to a first embodiment of the invention.

The embodiments of the present invention are related to methods for flying aircraft in a predetermined formation based on a relative navigation grid. FIG. 1 illustrates an embodiment including a first aircraft 2 and a second aircraft 4. The first aircraft 2 may be equipped with a grid generator 10, which may project a relative navigation grid, such as a plurality of intersecting lines, into space within a field of transmission 14. The general details of how to project the relative navigation grid are known in the art, which include the disclosure in U.S. Pat. No. 7,681,839, issued Mar. 23, 2010, entitled Optical Tracking System For Refueling, and US 2011/0153205, published Jun. 23, 2011, entitled Relative Navigation System, both of which are incorporated by reference. Therefore, the specific details of the grid generation will not be fully described in this application, only a general description sufficient for describing the embodiments of the invention will be provided.

As illustrated, the projected relative navigation grid comprises intersecting lines. At some distance away from the grid generator 10, these intersecting lines are observed as a grid in space, with the size of the relative navigation grid increasing away from the grid generator 10. The relative navigation grid in space generated by the grid generator 10 may be detected and read by a detector module 16 of the aircraft 4. For relative navigation between the aircraft 2 and the aircraft 4 it is presumed that detector module 16 of the aircraft 4 lies within the field of transmission of the grid generator 10, enabling the detector module 16 to "see" the relative navigation grid.

For description purposes, the grid generator 10 may be thought of as projecting intersecting lines substantially in the y direction of the coordinate system. If one were to observe the projection of intersecting lines in the x-z plane at some distance $R_2$ away from the grid generator 10, one would observe a first relative navigation grid 20. If one were to observe the same projection of intersecting lines at a distance $R_3$, which is greater than the first distance $R_2$ in the x-z plane, one would observe a second relative navigation grid 30, which appears relatively larger than the first relative navigation grid 20.

The first relative navigation grid 20 at distance $R_2$ away from the grid generator 10 is spatially bound in the horizontal direction by a first vertical line 22 and a second vertical line 24. There exists a plurality of vertical lines spatially and temporally generated in between the first vertical line 22 and the second vertical line 24. The first relative navigation grid 20 at a distance $R_2$ away from the grid generator 10 is spatially bound in the vertical direction by a first horizontal line 26 and a second horizontal line 28. There exists a plurality of horizontal lines spatially and temporally generated in between the first horizontal line 26 and the second horizontal line 28. The distance $R_2$ can be any distance between the relative navigation grid 20 and the grid generator 10.

The second relative navigation grid 30 at distance $R_3$ away from the grid generator 10 is for all practical purposes the same as the first relative navigation grid 20, but at further distance from the grid generator 10 than the first relative navigation grid 20. The relative navigation grid 30 is spatially bound in the horizontal direction by a first vertical line 32 of the second relative navigation grid 30 and a second vertical line 34 of the second relative navigation grid 30. There exists a plurality of vertical lines spatially and temporally generated in between the first vertical line 32 of the second relative navigation grid 30 and the second vertical line 34 of the second relative navigation grid 30. The second relative navigation grid 30 at a distance $R_3$ away from the grid generator 10 is spatially bound in the vertical direction by a first horizontal line 36 of the second relative navigation grid 30 and a second horizontal line 38 of the second relative navigation grid 30. There exists a plurality of horizontal lines spatially and temporally generated in between the first horizontal line 36 of the second relative navigation grid and the second horizontal line 38 of the second relative navigation grid.

The similarity of the relative navigation grids 20 and 30 becomes apparent in the case of projected grid lines, where the relative navigation grid 30 is formed by the same lines forming the relative navigation grid 20, except that the relative navigation grid 30 is observed at a further distance from grid generator 10, making the relative navigation grid 30 appear larger than the relative navigation grid 20. In this sense, the relative navigation grid 30 is the appearance of the grid lines generated by the grid generator 10 at the distance $R_3$ whereas the relative navigation grid 20 is the appearance of the grid lines at the distance $R_2$.

The relative navigation grids 20 and 30 may be of any number of lines. As illustrated, they are comprised of ten vertical lines by ten horizontal lines. A relative navigation grid comprised of a greater number of intersecting lines may result in improved detection for a fixed field of transmission 14 and distance from the detector module 16 than a relative navigation grid comprised of a fewer number of intersecting lines. The relative navigation grids 20 and 30 are depicted as a square shape, but this is not a requirement. The relative navigation grid can be any shape including rectangular, oval, or circular. Furthermore, the intersecting lines of the relative navigation grids 20 and 30 are depicted as orthogonal; however, this is not a requirement. The angles between the intersecting lines may be right angles, acute angles, or obtuse angles in different parts of the relative navigation grid.

The vertical and horizontal lines may be formed in any suitable manner by the grid generator 10. For example, all of the lines may be formed sequentially or all at once. Either one of the vertical lines or horizontal lines may be formed before the other. The grid generator 10 may alternate between vertical and horizontal lines. When the grid generator 10 uses a scanning laser to form the relative navigation grid, the laser will sequentially form all of one of the vertical and horizontal lines, followed by the sequential forming of the other of the vertical and horizontal lines. The rate at which the lines are sequentially formed may be so fast that for practical purposes, it is as if all of the grid lines were simultaneously formed. The radiation source for the plurality of projected lines may be a coherent or incoherent radiation source. For example, when the radiation source is a coherent source, it may be a solid state laser that emits radiation at a wavelength in the near-UV range. Additionally, the radiation frequency and/or intensity may be selected, or attenuated by use of an optical filter, to reduce the risk of eye damage. The grid of intersecting projected lines may be generated by raster scanning each of the lines or by projecting and scanning an elongated radiation beam. Any suitable methods and apparatus for generating the intersecting lines may be used.

Although, examples shown use Cartesian coordinates, any appropriate coordinate system may be used including polar, cylindrical, or spherical coordinate systems for both grid generation and for grid detection. For example, to form a grid amenable to polar coordinate representation, a series of concentric circles and lines radiating out from the center of those circles may be projected by the grid generator into space.

Grid data may be encoded at one or more locations of the relative navigation grid. By grid data, it is meant that the structure or characteristic of the relative navigation grid provides data or information that may be read or detected by the detector module 16. In one embodiment, the projected lines comprising the series of projected intersecting lines are further encoded with different grid data in different regions of the relative navigation grid to indicate regions within the grid of intersecting lines. One manner of encoding of the grid data is by modulating the beam in the case of a laser being used to form the relative navigation grid. The modulation is achieved by changing the intensity of the beam and/or blocking the beam with some periodicity. Such a grid data may include a number and it is contemplated that each of the grid lines may include a number, which identifies the grid line to the detector module 16 of the aircraft 4.

For example the relative navigation grid may be encoded with data that indicates the exact position within the relative navigation grid that defines the relative position of that point to the emitting aircraft 2. Each scanning beam or portion of the relative navigation grid has a defined and fixed reference position to the emitting aircraft 2. During formation flying the aircraft 4 with its detector module 16 may detect this modulated signal and by decoding the signal it may determine its position relative to the emitting aircraft 2 and its position may be adjusted accordingly. In this manner, the aircraft 4 may be considered a reading aircraft that reads the emitted relative navigation grid. The aircraft 4 may calculate the spatial relationship between it and the emitting aircraft 2 based on its reading of the emitted relative navigation grid. The calculation of the spatial relationship may be conducted by a processor (not shown) aboard the aircraft 4.

It will be understood that during operation, the grid generator 10 may form repeated relative navigation grid projections and a complete relative navigation grid may be projected multiple times a second, the relative navigation grid, as detected by the detector module 16 may appear to jump around or jitter, making it difficult for the aircraft 4 to follow the relative navigation grid. In reality, while the relative navigation grid may appear jumpy, it typically will not have substantively moved. The relative navigation grid may be stabilized to account for such movement of the grid generator 10 and provide a relative navigation grid that appears relatively stable. Such stabilization has been described in the disclosure Ser. No. 13/286,710, filed Nov. 1, 2011, and entitled Relative Navigation System, which is incorporated by reference.

Figure 2:
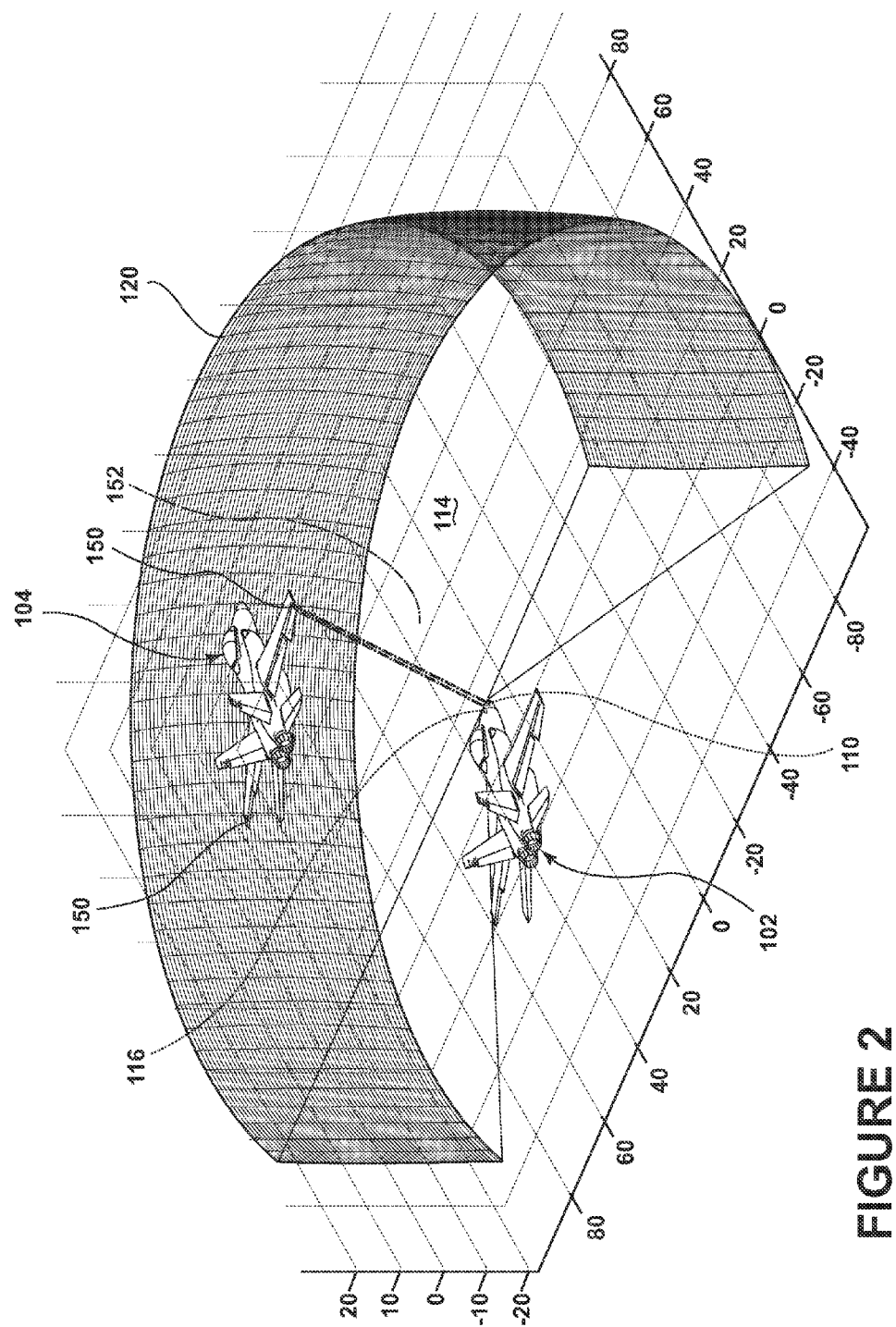
FIG. 2 is a perspective view of aircraft, a grid generator, and a reflector according to a second embodiment of the invention.

As there may be any number of aircraft flying in the formation a larger envelope for the relative navigation grid may be needed. FIG. 2 illustrates alternative aircraft 102 and 104 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted.

One difference between the first embodiment and the second embodiment is that the aircraft 102 includes a grid generator 110 capable of producing a relative navigation grid 120 having a larger field of transmission than that produced by the grid generator 10. More specifically, the grid generator 110 is illustrated as creating an exemplary relative navigation grid 120 that has a field of transmission 114 that is a +/−100 degree equatorial section (200 degrees total) of a sphere with a height of +/−20 degrees. It is contemplated that the grid generator 110 may be configured to create a variety of shapes and sizes for the field of transmission 114 such that the relative navigation grid may be emitted in particular sectors of a hemisphere relative to the emitting aircraft 102.

Another difference is that the aircraft 104 is illustrated as including an optical reflector 150 instead of a detector module. The aircraft 104 may include any number of such optical reflectors 150 and such optical reflectors 150 may be placed at any suitable alternative location on the aircraft 104. Further, the aircraft 102 is illustrated as including a detector module 116 or other grid reader. During formation flying, one or more of the optical reflectors 150 may return the at least a portion of the transmitted grid back to the emitting aircraft 102; this is schematically illustrated with the reflection 152. More specifically, the optical reflector 150 reflects the portion of the grid that it "sees" from the emitting aircraft 102, back to the emitting aircraft 102. Thus, depending on the shape of the optical reflector 150 the reflection or portion of the grid reflected back may vary. The detector module 116 of the aircraft 102 may read the reflected signal and by decoding the signal the aircraft 102 may determine its position relative to the aircraft 104. Unlike the first embodiment, in the second embodiment the reading aircraft and the emitting aircraft are the same aircraft 102. Once the emitting aircraft 102 knows the grid position of the optical reflector 150 on the aircraft 104 its position may be adjusted accordingly.

Figure 3:
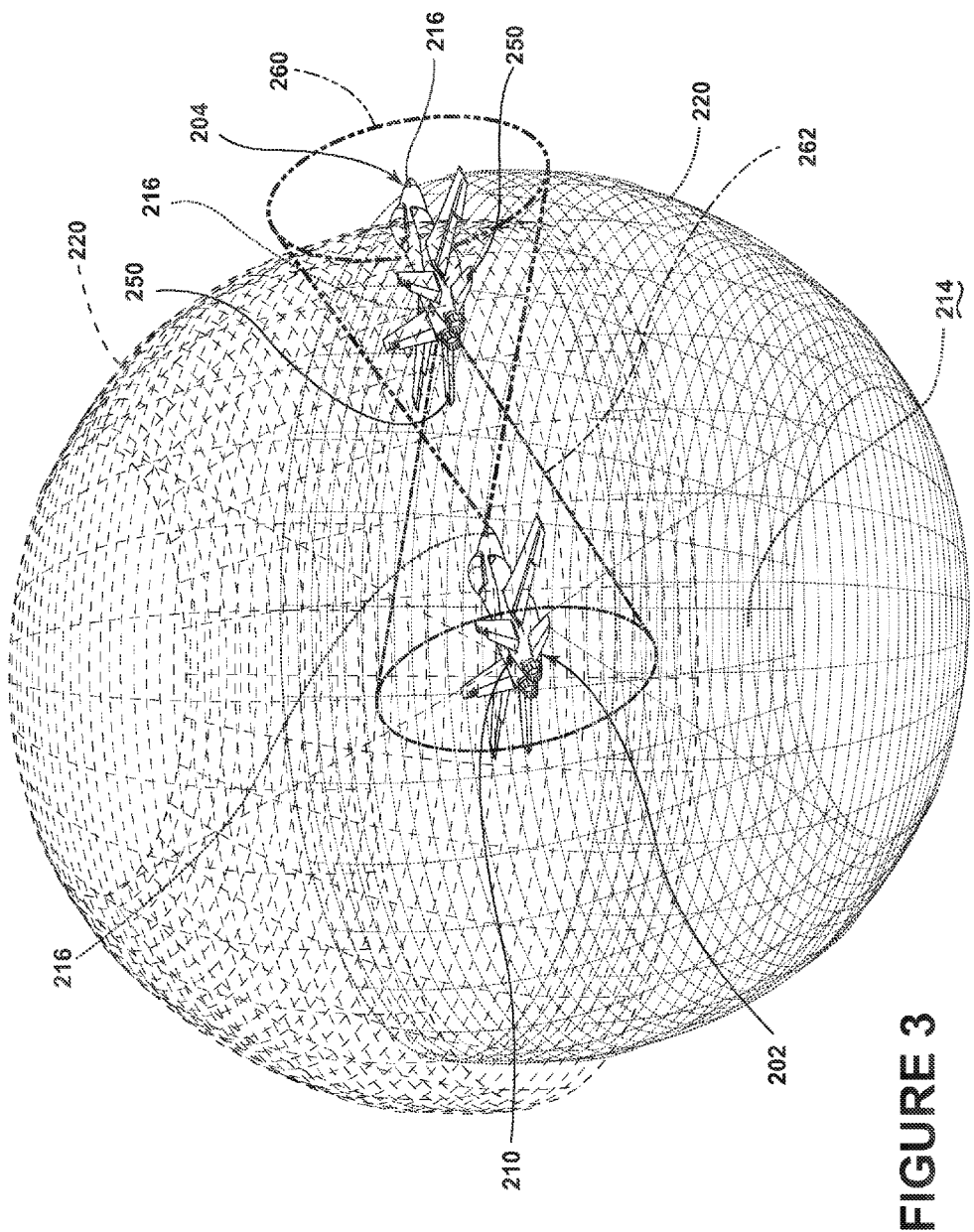
FIG. 3 is a perspective view of aircraft, a grid generator, and optical data links according to a third embodiment of the invention.

FIG. 3 illustrates alternative aircraft 202 and 204 according to a third embodiment of the invention. The third embodiment is similar to the second embodiment; therefore, like parts will be identified with like numerals increased by 100, with it being understood that the description of the like parts of the second embodiment applies to the third embodiment, unless otherwise noted.

The aircraft 202 is illustrated as including multiple grid generators 210 that are configured to transmit relative navigation grids 220 that collectively form a field of transmission 214 that create two somewhat opposing hemispheres around the aircraft 202. The relative navigation grids 220 may also be more aligned such that the field of transmission 214 creates a sphere around the aircraft 202. In this manner the relative navigation grid may be emitted in such a manner that any blind spots relative to the emitting aircraft 202 are eliminated. The relative navigation grid 220 may be emitted from multiple locations on the emitting aircraft 202 and any number of grid generators may be used to create such a spherical field of transmission 214 around the aircraft 202 including that a single grid generator may be configured to transmit such a field of transmission around the aircraft 202.

It has been contemplated that the information related to the relative positions of the aircraft may be broadcast between the aircraft. In such an instance, the reading aircraft may transmit the spatial relationship to the emitting aircraft and the emitting aircraft may adjust its position if necessary. The emitting aircraft 202 has been illustrated as including an optical data link 260, schematically illustrated as extending from the aircraft 202. Similarly, the aircraft 204 has been illustrated as including an optical data link 262. It will be understood that the optical data links 260 and 262 may include any suitable communication having a certain range or field of transmission. The optical data links 260 and 262 may be capable of transmitting and receiving data from collaborating or cooperative aircraft that are suitably equipped.

The aircraft 204 has been illustrated as including optical reflectors 250 and the aircraft 202 may include a detector module 216, which could be a separate module as illustrated or could be included in the grid generators 210. Alternatively, the aircraft 204 may include a detector module 216. As described above the aircraft 202 and 204 may determine their relative position. Once one of the two aircraft 202 and 204 knows the relative position between the two aircraft 202 and 204 this information may be transmitted via the optical data links 260 and 262 to the other of the aircraft and one or both of the aircraft may adjust their positions accordingly.

It is contemplated that for any of the above embodiments that the size and field of regard of the generated relative navigation grid may be tailored to mission and flight profile requirements. While all of the examples given so far have include two aircraft it will be understood that any number of aircraft may fly in formation and adjust their relative positions if they are so suitable equipped. If the multiple aircraft are equipped with optical data links the multiple aircraft may be capable of maintaining relative navigation with only one aircraft equipped with a grid generator. It is contemplated that in such an instance the reading aircraft may transmits the spatial relationship to the others of the multiple aircraft.

Figure 4:
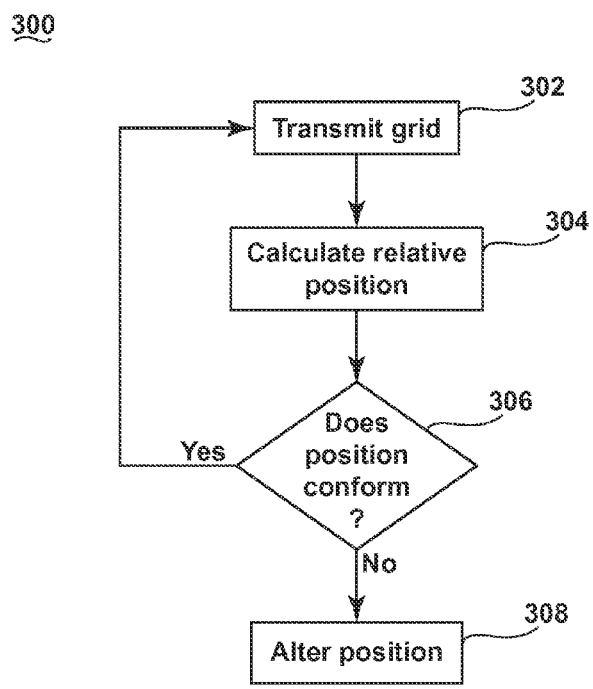
FIG. 4 is a flow chart of an embodiment of a method for flying aircraft in a predetermined formation.

FIG. 4 illustrates a method 300 for two or more aircraft to fly in close proximately according to a predetermined formation without colliding according to one embodiment of the invention. Such a method may be used with any of the above described embodiments. The method 300 begins at 302 with emitting from one of the aircraft a relative navigation grid to define an emitting aircraft amongst the aircraft. Such emitting may include emitting the relative navigation grid in a direction where another aircraft should be in the predetermined formation. The direction may be at least one of forward and rearward along a direction of travel of the emitting aircraft. Alternatively, the direction may be an alternative direction including upwards, downwards, to one sides, or a combination of several directions.

At 304, the spatial relationship between at least two of the aircraft based on the emitted relative navigation grid may then be calculated. This may be done by a processor on the reading aircraft. At 306, one of the aircraft may then determine if the spatial relationship conforms with the predetermined formation. If the spatial relationship conforms to the predetermined formation, the method may return to transmitting the relative navigation grid at 302 and the method may be repeated until it is determined that the spatial relationship of the aircraft does not conform to the predetermined formation. When the spatial relationship does not conform to the predetermined formation, a relative position of at least one of the aircraft may be altered to position the aircraft in the predetermined formation. It will be understood that the emitting, calculating, determining, and altering may be repeated to maintain the aircraft in the predetermined formation during flight.

It should be noted that the sequence depicted is for illustrative purposes only and is not meant to limit the method 300 in any way. It may be understood that the portions of the method may proceed in a different logical order, additional or intervening portions may be included, or described portions of the method may be divided into multiple portions, or described portions of the method may be omitted without detracting from the described method.

The method becomes more complex when more than two aircraft are flying in formation and when those aircraft are equipped with any number and combination of emitters, detector modules, and reflectors to form any number and combination of emitting aircraft, deflecting aircraft and reading aircraft. The reading aircraft may be the same as the emitting aircraft, in the case of reflectance from another aircraft, or it can be a separate aircraft, or a combination of both.

Further, the reading aircraft may be an aircraft other than the two aircraft, there may be multiple reading aircraft, multiple reflecting aircraft, and/or multiple emitting aircraft. By way of non-limiting example, in the case where there are more than two aircraft a reflection may be sent to another aircraft that is not the emitting aircraft, which may read the reflected relative navigation grid position and make the desired calculations and transmissions, etc. More than one of the multiple reading aircraft may calculate the spatial relationship data. It is contemplated that at least one of the multiple reading aircraft may determine the spatial relationship between a different two aircraft. Further, more than one of the multiple reading aircraft may transmit the spatial relationship data to the at least some of the other aircraft regardless of whether the grid information was received through reflectance or direct detection.

Figure 5:
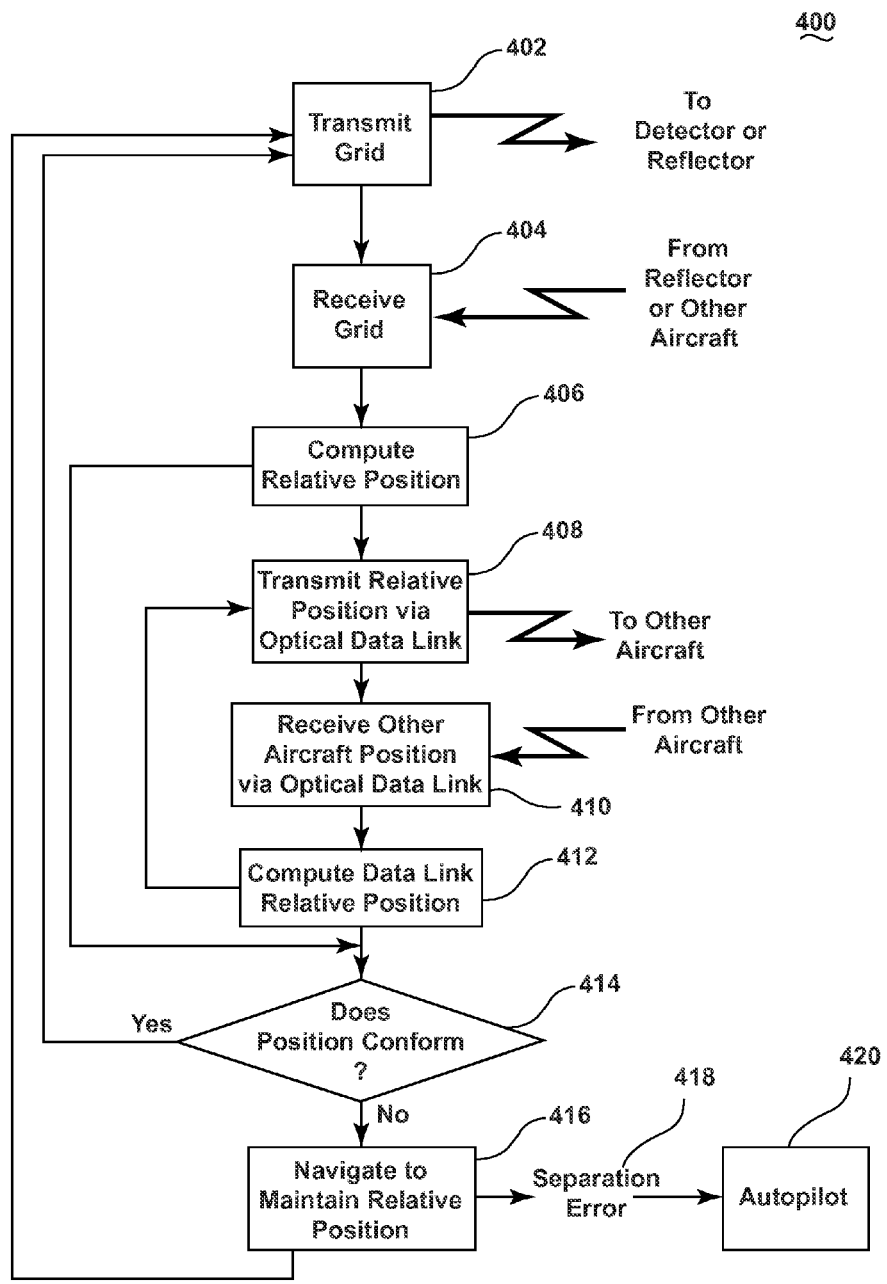
FIG. 5 is a flow chart of another embodiment of a method for flying aircraft in a predetermined formation.

FIG. 5 illustrates a method 400 for flying multiple aircraft in a predetermined formation according to another embodiment of the invention. Possible formations may include but are not limited to, a V formation, a box formation, a ladder formation, a route formation, an echelon formation, and a wall formation. It should be noted that the sequence depicted is for illustrative purposes only and is not meant to limit the method 400 in any way. It may be understood that the portions of the method may proceed in a different logical order, additional or intervening portions may be included, or described portions of the method may be divided into multiple portions, or described portions of the method may be omitted without detracting from the described method.

The method 400 begins at 402 with transmitting from one or more of the aircraft a relative navigation grid to define one or more emitting aircraft amongst the multiple aircraft. It will be understood that the relative navigation grid may be transmitted to aircraft that have reflectors and/or detector modules. At 404 the relative navigation grid position may be received by one or more reading aircraft through reflection and/or by directly reading the transmitted relative navigation grid. At 406, the spatial relationship between at least two of the aircraft based on the read relative navigation grid may then be calculated.

At 408, such as spatial relationship may be transmitted via optical data links to other of the multiple aircraft. At 410, the position of the other aircraft may be received by other of the multiple aircraft. At 412, one of the aircraft having received the data link information may compute relative positions of at least some of the multiple aircraft based on such data link information. Such a computation may be done in a flight control computer or other processor of the aircraft. At 414, it may be determined if the spatial relationship conforms with the predetermined formation. This may also be done in a flight control computer or other processor of the aircraft and the determination assumes knowledge of the predetermined formation and the location of the grid generator in the formation. If the spatial relationship conforms the method may return to transmitting the relative navigation grid at 402 and the method may be repeated until it is determined that the spatial relationship of the aircraft does not conform to the predetermined formation. If the spatial relationship does not conform to the predetermined formation, the method may proceed to 416. The determination may take into account both the relative position computed at 408 based on information received related to the relative navigation grid through a detector module and any additional relative positions computed at 412 based on information from the optical data links. In this manner the position of the aircraft may be determined relative to a number of multiple aircraft.

At 416, one or more of the multiple aircraft may navigate to maintain the predetermined relative position. This may include the separation error of the aircraft from its predetermined position being sent at 418 to the autopilot of the aircraft such that the autopilot may adjust the location of the aircraft at 420. The use of autopilot in this manner may be more accurate and faster than human response by using available electrical signals for electronic control of the aircraft for purposes of flight coordination and avoiding collisions between aircraft.

The methods described above are for exemplary purposes only and are not meant to limit the inventive embodiments in any way as it is understood that the portions of the method may proceed in a different logical order, additional or intervening portions may be included, or described portions of the method may be divided into multiple portions, or described portions of the method may be omitted without detracting from the described method. For example, it is contemplated that above embodiments may also be used with unmanned aircraft and may provide a mechanism for loop closure for the aircraft flight control systems such that unmanned aircraft may coordinate their relative positions and velocities automatically without the need for pilot or external control.

The above described embodiments provide for a number of benefits. For example, the above described embodiments may allow for formation flying with much higher precision, much faster data rates, and lower observable relative navigation information at a lower cost than contemporary systems. The technical effect being that the embodiments described above may, for aircraft separated by approximately 100 feet, accurately and rapidly measure the 3-dimensional relative position of an adjacent aircraft to an accuracy of better than 1 inch and within 50 milliseconds. The embodiments described above may be used to make determinations in real time or near real time and the determinations may be carried out automatically and reliably without human intervention or constant maintenance in order to meet requirements of specific applications and to reduce system operation cost.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of flying aircraft in a predetermined formation, the method comprising:
    emitting from one of the aircraft a relative navigation grid to define an emitting aircraft amongst the aircraft;
    calculating, by a processor, a spatial relationship between two of the aircraft based on the emitted relative navigation grid;
    determining, by a processor, if the spatial relationship conforms with the predetermined formation; and
    altering a relative position of at least one of the aircraft to position the aircraft in the predetermined formation when the spatial relationship does not conform with the predetermined formation.

2. The method of claim 1, further comprising repeating the emitting, calculating, determining, and altering to maintain the aircraft in the predetermined formation.

3. The method of claim 1 wherein the emitting further comprises emitting the relative navigation grid in a direction where another aircraft should be in the predetermined formation.

4. The method of claim 3 wherein the direction is at least one of forward and rearward along a direction of travel of the emitting aircraft.

5. The method of claim 1 wherein the emitting further comprises emitting the relative navigation grid in at least a sector of a hemisphere relative to the emitting aircraft.

6. The method of claim 1 wherein the emitting further comprises emitting the relative navigation grid to eliminate any blind spots relative to the emitting aircraft.

7. The method of claim 1 wherein the emitting further comprises emitting the relative navigation grid from multiple locations on the emitting aircraft.

8. The method of claim 1 wherein the calculating the spatial relationship is conducted by a processor aboard at least one of the aircraft.

9. The method of claim 1 wherein at least one of the aircraft is a reading aircraft that reads the emitted relative navigation grid.

10. The method of claim 9 wherein the reading aircraft calculates the spatial relationship based on the reading of the emitted relative navigation grid.

11. The method of claim 10 wherein the reading aircraft transmits the spatial relationship to at least another one of the aircraft.

12. The method of claim 11 wherein the reading aircraft and the emitting aircraft are the same aircraft.

13. The method of claim 12 wherein the other of the two aircraft reflects at least a portion of the emitted relative navigation grid to the emitting aircraft.

14. The method of claim 13 wherein the reading aircraft reads the reflected relative navigation grid.

15. The method of claim 11 wherein the reading aircraft and the emitting aircraft are different aircraft.

16. The method of claim 15 wherein the reading aircraft is the other of the two aircraft.

17. The method of claim 15 wherein the reading aircraft is an aircraft other than the two aircraft.

18. The method of claim 10 wherein there are at least multiple reading aircraft or multiple emitting aircraft.

19. The method of claim 18 wherein there are both multiple reading aircraft and multiple emitting aircraft.

20. The method of claim 19 wherein more than one of the multiple reading aircraft transmits the spatial relationship data to the at least some of the other aircraft.

21. The method of claim 20 wherein at least one of the multiple reading aircraft determines the spatial relationship between a different two aircraft.

22. A method of flying multiple aircraft in a predetermined formation, the method comprising:
    emitting from at least one of the multiple aircraft a relative navigation grid to define at least one emitting aircraft amongst the multiple aircraft;
    calculating, by a processor, a spatial relationship between the multiple aircraft based on the at least one emitted relative navigation grid;
    determining, by a processor, if the spatial relationship conforms with the predetermined formation;
    transmitting the spatial relationship to at least another one of the multiple aircraft; and
    altering a relative position of at least the another one of the multiple aircraft to position the aircraft in the predetermined formation when the spatial relationship does not conform with the predetermined formation.

23. The method of claim 22 wherein at least one of the multiple aircraft is a reading aircraft that reads the emitted relative navigation grid from at least one emitting aircraft.

24. The method of claim 23 wherein the reading aircraft transmits the spatial relationship to the at least another one of the multiple aircraft.

25. The method of claim 22 wherein another of the multiple aircraft reflects at least a portion of the emitted relative navigation grid to the reading aircraft.

* * * * *